United States Patent [19]

McCulloch et al.

[11] Patent Number: 5,212,250

[45] Date of Patent: May 18, 1993

[54] POLY(MALEIC ANHYDRIDE) COPOLYMERS WITH SIDE CHAINS EXHIBITING NONLINEAR OPTICAL RESPONSE

[75] Inventors: Iain McCulloch, Plainfield, N.J.; Thomas M. Leslie, Huntsville, Ala.

[73] Assignee: Hoechst Celanese Corp., Somerville, N.J.

[21] Appl. No.: 761,115

[22] Filed: Sep. 17, 1991

[51] Int. Cl.$^5$ ............................................. C08F 267/04
[52] U.S. Cl. ................................... 525/276; 525/291; 525/293; 525/295; 525/327.4; 525/327.5; 525/327.6; 525/327.7; 525/351; 525/353; 525/359.4; 525/376; 526/271; 526/272
[58] Field of Search ............... 525/327.4, 327.5, 327.6, 525/327.7, 276, 291, 293, 295, 351, 359.4, 353, 376; 526/243, 245, 248, 271, 298, 272

[56] References Cited

PUBLICATIONS

D. R. Ulrich (1988) Mol Cryst Liq Cryst 160, 1-31.
Hawleys Chemical Dictionary, 11th Ed (Van Nostrand, New York, 1987), p. 854.

*Primary Examiner*—Joseph L. Schofer
*Assistant Examiner*—M. Nagumo
*Attorney, Agent, or Firm*—P. S. Kalyanaraman

[57] ABSTRACT

In one embodiment this invention provides poly(maleic anhydride) side chain copolymers which exhibit nonlinear optical susceptibility and which can be formed into crack-free thin film waveguiding media. An invention copolymer is illustrated by the recurring structure:

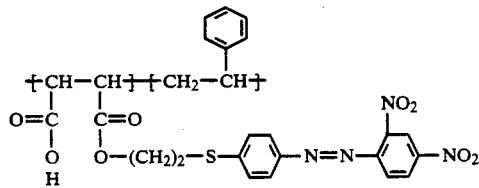

The side chain chromophores can be oriented by an external field to form a noncentrosymmetric thin film which exhibits second order nonlinear optical susceptibility.

25 Claims, No Drawings

POLY(MALEIC ANHYDRIDE) COPOLYMERS WITH SIDE CHAINS EXHIBITING NONLINEAR OPTICAL RESPONSE

BACKGROUND OF THE INVENTION

It is known that organic and polymeric materials with large delocalized $\pi$-electron systems can exhibit nonlinear optical response, which in many cases is a much larger response than by inorganic substrates.

Thin films of organic or polymeric materials with large second order nonlinearities in combination with silicon-based electronic circuitry have potential as systems for laser modulation and deflection, information control in optical circuitry, and the like.

Polymers with a comb structure of pendant side chains are a new class of organic materials which exhibit interesting optical properties. In U.S. Pat. Nos. 4,694,066; 4,755,574; and 4,762,912 polymers are described which have pendant side chains which exhibit nonlinear optical susceptibility, in addition to mesogenic properties. U.S. 4,792,208 discloses nonlinear optically responsive organic compounds and side chain polymers in which the molecular dipoles have an electron donor moiety linked through a conjugated $\pi$ bonding system to an electron acceptor sulfonyl moiety.

There is continuing interest in the theory and practice of optically responsive polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches.

Accordingly, it is an object of this invention to provide polyvinyl copolymers having pendant side chains which exhibit a high level of nonlinear optical response.

It is another object of this invention to provide poly(maleic anhydride) copolymers and crosslinked copolymers which exhibit nonlinear optical response, and which can form optically transparent films that resist cracking and exhibit excellent adhesive properties in multilayer laminated structures.

It is a further object of this invention to provide optical waveguide media comprising a thin film of a polymer with nonlinear optically responsive pendant side chains which can be uniaxially aligned by an external field.

Other objects and advantages of the present invention shall become apparent from the accompanying description and examples.

DESCRIPTION OF THE INVENTION

One or more objects of the present invention are accomplished by the provision of a copolymer which is characterized by recurring monomeric units corresponding to the formula:

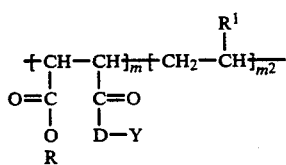

where $m^1$ and $m^2$ are integers which total at least 10, and the $m^1$ monomer comprises between about 10-90 mole percent of the total $m^1+m^2$ monomeric units; R is hydrogen or a $C_1$-$C_{10}$ hydrocarbyl substituent; $R^1$ is a $C_1$-$C_4$ alkoxyl or $C_6$-$C_{12}$ aromatic substituent; D is —O— or —NH—; and Y is a pendant organic side chain containing a conjugated olefinically unsaturated structure which exhibits nonlinear optical susceptibility.

Illustrative of the R substituent are methyl, ethyl, butyl, hexyl, decyl, cyclopentyl, cyclohexenyl, phenyl, 4-methoxyphenyl, and the like.

Illustrative of the $R^1$ substituent are methoxy, ethoxy, propoxy, butoxy, phenyl, chlorophenyl, methoxyphenyl, tolyl, acetoxyphenyl, and the like.

An invention polymer typically has a weight average molecular weight in the range between about 5000-200,000, and a glass transition temperature in the range between about 40°-150° C.

Depending on the particular monomers selected, an invention copolymer as represented in Formula I can exhibit liquid crystalline properties. However, a typical invention copolymer normally is amorphous, and forms films with excellent optical clarity for purposes of radiation wave transmission such as in an optical waveguiding device described in U.S. Pat. Nos. 4,767,169; 4,865,406; 4,936,444; and 4,936,645.

In another embodiment this invention provides a crosslinked copolymer which is characterized by recurring monomeric units corresponding to the formula:

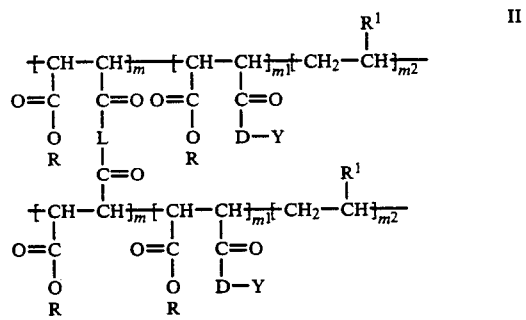

where m is an integer of at least 1; $m^1$ and $m^2$ are integers which total at least 10, and the $m^1$ monomer comprises between about 10-90 mole percent of the total $m^1+m^2$ monomeric units; R is hydrogen or a $C_1$-$C_{10}$ hydrocarbyl substituent; $R^1$ is a $C_1$-$C_4$ alkoxyl or $C_6$-$C_{12}$ aromatic substituent; D is —O— or —NH—; Y is a pendant organic side chain containing a conjugated olefinically unsaturated structure which exhibits nonlinear optical susceptibility; and L is a crosslinking branch which has a chain length of between about 2-20 atoms.

The Y substituent in Formulas I and II as represented above preferably contains a diphenyl, stilbene or azobenzene structure in conjugation with an electron-donating group and an electron-withdrawing group. The divalent L substituent preferably is derived from a diol or diamine starting material.

In another embodiment this invention provides a copolymer which is characterized by recurring monomeric units corresponding to the formula:

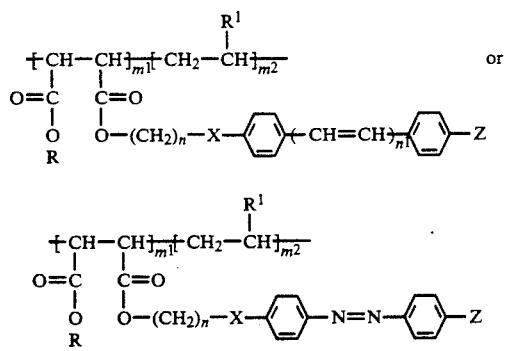

where $m^1$ and $m^2$ are integers which total at least 10, and the $m^1$ monomer comprises between about 10–90 mole percent of the total $m^1 + m^2$ monomeric units; R is hydrogen or a $C_1$–$C_{10}$ hydrocarbyl substituent; $R^1$ is a $C_1$–$C_4$ alkoxyl or $C_6$–$C_{12}$ aromatic substituent; n is an integer with a value of 2–10; $n^1$ is an integer with a value of 0–2; X is an electron-donating group; and Z is an electron-withdrawing group.

Illustrative of the X substituent in the formula are —O—, —S— and —$NR^2$—, and $R^2$ is hydrogen or a $C_1$–$C_4$ alkyl substituent.

Illustrative of the Z substituent in the formula are —$NO_2$, —CN, —$CF_3$, —CH=$C(CN)_2$, —$C(CN)_2$ and —$SO_2CF_3$.

In another embodiment this invention provides an optical medium comprising a thin film of a copolymer which is characterized by recurring monomeric units corresponding to the formula:

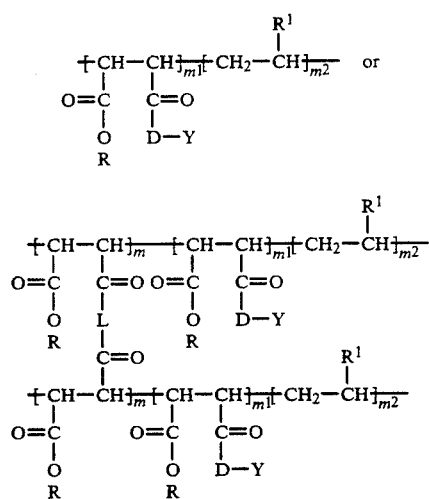

where all substituent designations are as previously defined.

A present invention polymer having pendant side chains which exhibit nonlinear optical susceptibility $\beta$ can be formed into a nonlinear optical waveguide medium, such as a transparent film or coating on a substrate. A polymer can be applied to a supporting substrate by conventional means, such as spin coating, spraying, Langmuir-Blodgett deposition, and the like.

A supporting substrate for an invention optical waveguide medium can be constructed of any convenient non-conducting medium such as plastic, glass, or silicon.

A film or coating fabricated with a present invention polymer initially exhibits third order nonlinear optical susceptibility. A thin film optical waveguide medium of the present invention after fabrication is subjected to an external field to orient and align uniaxially the polymer side chains. In one method the polymer medium is heated close to or above the polymer glass transition temperature $T_g$, then an external field (e.g., a DC electric field) is applied to the medium of mobile polymer molecules to induce uniaxial molecular alignment of polymer side chains parallel to the applied field, and the medium is cooled while maintaining the external field effect.

By this method a present invention thin film optical waveguide medium has a stable uniaxial alignment of polymer side chains. The poled optical medium exhibits a second order nonlinear optical susceptibility $\chi^{(2)}$. A present invention poled thin film optical medium is capable of exhibiting a $\chi^{(2)}$ level of $1 \times 10^{-8}$ esu or higher as measured at 1.34 $\mu$m excitation wavelength.

The term "external field" as employed herein refers to an electric, magnetic or mechanical stress field which is applied to a substrate of mobile molecules, such as to induce dipolar alignment of polymer side chains parallel to the field.

The term "amorphous" as employed herein refers to a transparent polymeric optical medium which does not have a preferred short range molecular order that exhibits optical anisotropy.

Preparation Of Invention Copolymers

General procedures for the preparation of invention copolymers and crosslinked copolymers are exemplified by the following flow diagrams:

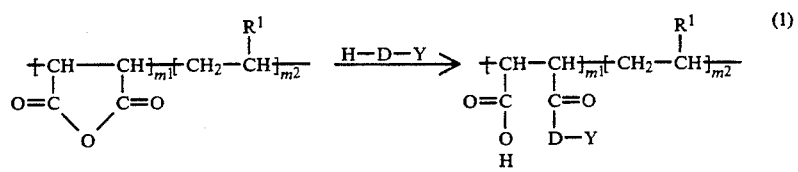

-continued

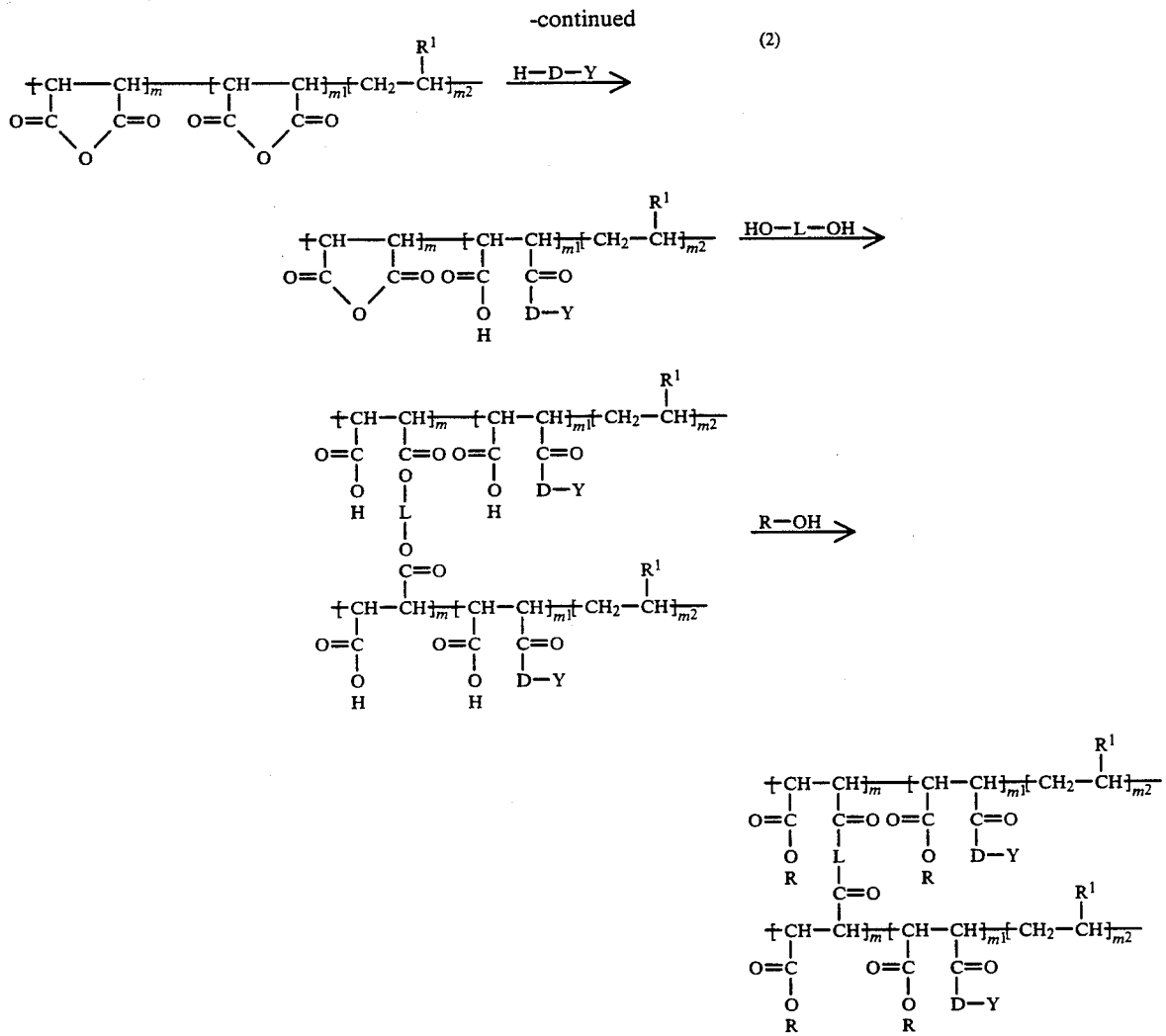

Alternatively, the HO-L-OH diol can be used for crosslinking in diagram 2 prior to the polymer reaction with H-D-Y.

A present invention copolymer as illustrated in diagram (1) above can form a crack-free, optically transparent film on a supporting substrate. The free carboxylic acid groups improve adhesion to the underlying substrate. A wide variety of Y chromophores can be utilized, including those which are known to inhibit or are sensitive to free radical polymerization conditions.

A present invention crosslinked copolymer as illustrated in diagram (2) exhibits excellent adhesion and toughness when formed into a film. If the crosslinking is introduced after a film has been poled to orient the side chain chromophores, a permanently-stable noncentrosymmetric molecular configuration is achieved.

Nonlinear Optical Properties

The fundamental concepts of nonlinear optics and their relationship to chemical structures can be expressed in terms of dipolar approximation with respect to the polarization induced in an atom or molecule by an external field.

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave.

A present invention copolymer contains a chromophore which has low molecular symmetry and exhibits an exceptionally high second order nonlinear optical susceptibility $\beta$. A present invention copolymer contains a chromophore such as one corresponding to 4-[N-(2-hydroxyethyl)-N-methylamino]-4'-nitrostilbene that exhibits a second order nonlinear optical susceptibility which is about equal to that of 4-N,N-dimethylamino-4'-nitrostilbene (DANS). The corresponding azobenzene derivative exhibits a higher susceptibility than DANS:

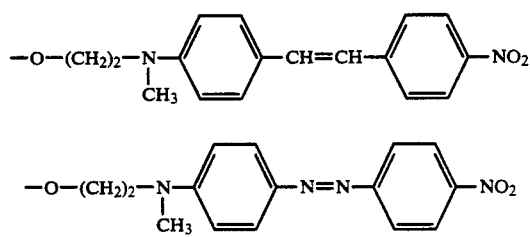

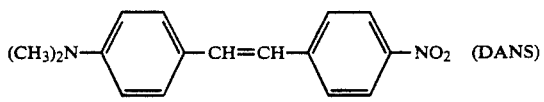

Preferred copolymers of the present invention are soluble in common polar solvents such as tetrahydrofuran or dimethylformamide, and can be formed into waveguiding thin films which are amorphous and have excellent optical transparency (less than about 2 dB/cm optical loss), and are readily polable to a noncentrosymmetric matrix exhibiting second order nonlinear optical susceptibility $\chi^{(2)}$.

Invention copolymers are further characterized by a relatively high glass transition temperature $T_g$, and can be formed into crack-free thin film waveguiding media.

A present invention thin film optical waveguide medium can be utilized as a nonlinear optical component of a laser frequency converter, an optical Kerr effect device, an electrooptical Kerr effect device, a degenerate four wave mixing device, an optical interferometric waveguide gate, a wide-band electrooptical wave analog-to-digital converter, an all-optical multiplexer, an all-optical demultiplexer, an optical bistable device, an optical parametric device, and the like, as elaborated in U.S. Pat. Nos. 4,767,169 and 4,775,215.

An optical interferometric waveguide gate device is described by A. Lattes et al in IEEE J. Quantum Electronics, QE-19(11), 1718 (1983).

A wide-band electrooptical guided-wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6), 280 (1977) and in IEEE Spectrum, June 1981.

Optical parametric devices are described in U.S. Pat. Nos. 3,371,220; 3,530,301; and 3,537,020.

A present invention optical device can be achieved by constructing one of the optical devices described in the technical literature, except that a present invention polymer medium is utilized as the nonlinear optical component.

The theory of nonlinear harmonic generation by frequency modulation of coherent light with organic optical media is elaborated by A. F. Garito et al in Chapter 1, "Molecular Optics: Nonlinear Optical Properties Of Organic And Polymeric Crystals"; ACS Symposium Series 233 (1983).

The following examples are further illustrative of the present invention. The components and specific ingredients are presented as being typical, and various modifications can be derived in view of the foregoing disclosure with in the scope of the invention.

EXAMPLE I

This Example illustrates the preparation of chromophoric compounds.

(1)
4-[N-(2-Hydroxyethyl)-N-methylamino]-4'-nitrostilbene

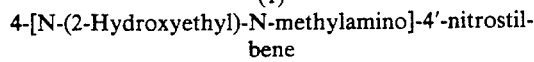

To a solution of p-nitrophenylacetic acid (543 g, 3 mol) in toluene (6 liters) is added the aniline Schiff base of 4-(N-hydroxyethyl-N-methyl)benzaldehyde (686 g, 2.7 mol), and the mixture is stirred at room temperature until completely dissolved. Acetic acid (325 ml) is added slowly, and the solution is warmed to 65° C. and the reaction is conducted with stirring for a period of about 18 hours. On cooling, the product separates as crystals, and the solid is collected by filtration. The said product is recrystallized from acetonitrile and toluene to provide the title compound (716.2 g, 89%).

(2)
[4'-N-(2-hydroxyethyl)-N-ethylaminophenylazo]cyanobenzene

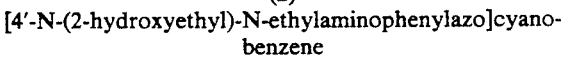

4-Aminobenzonitrile (20 g, 197 mmol) is added to a stirred solution of conc. HCl (42.4 ml, 130 mmol) in $H_2O$ (100 ml). The temperature is held below 10° C., and a solution of $NaNO_2$ (11.7 g, 197 mmol) in $H_2O$ (50 ml) is added, and the solution is maintained at about 6° C. by the addition of portions of crushed ice. The reaction is monitored by potassium iodide-starch paper.

A mixture of N-ethyl-N-(2-hydroxyethyl)aniline (28.0 g, 192 mmol) and sodium acetate (47.2 g, 0.6 mol) in water (100 ml) is cooled in ice and slowly added to the diazonium salt with stirring. The product precipitate which forms is collected by filtration, and the crude product is washed with water. The recovered product is recrystallized from ethanol to yield deep red crystals, mp 142.5° C.

(3)
4-[4'-N-(2-hydroxyethyl)-N-ethylaminophenylazo]nitrobenzene

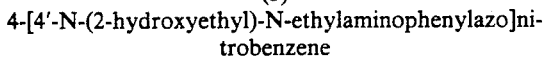

The procedures of preparation (2) are followed except that a molar equivalent of 4-nitroaniline is substituted for the 4-aminobenzonitrile reactant.

EXAMPLE II

This Example illustrates the preparation of poly(maleic anhydride) copolymers.

(1) Styrene:maleic anhydride (1:1) with high molecular weight

To a degassed solution of maleic anhydride (24.2 g, 0.247 mol) in chlorobenzene (400 ml) is added an equimolar amount of styrene (25.7 g, 0.247 mol) and with azodiisobutyronitrile initiator at 1 mol %, and the solution is stirred for about 18 hours at 60° C. The resultant polymer product slurry is poured into hexane, and the polymer is recovered by filtration. Purification is accomplished by reprecipitation of tetrahydrofuran solution of the polymer into toluene.

The copolymer has a $T_g$ of 153° C., and a viscosity average molecular weight of $6.8 \times 10^5$ by gel permeation chromatography.

Low molecular weight styrene:maleic anhydride copolymers are available commercially (Polysciences).

(2) Butyl vinyl ether:maleic anhydride (1:1)

The experimental procedures of preparation (1) are followed, except that a molar equivalent of butyl vinyl ether is substituted for the styrene reactant, and cooling is applied to control the exothermic polymerization reaction.

EXAMPLE III

This Example illustrates the preparation of invention side chain copolymers.

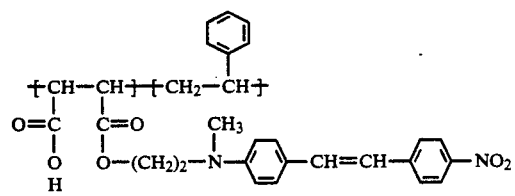

To a stirred solution of the Table copolymer 1 (5.05 g, 25 mmol) in cyclopentanone (100 ml) is added slowly 4-[N-(2-hydroxyethyl)-N-methylamino]-4'-nitrostilbene (8.94 g, 30 mmol). A 2 molar excess of p-dimethylaminopyridine (DMAP) (8.1 g, 60 mmol) is added, and the solution is stirred for 15 hours at 100° C. The resultant product mixture is poured into ethyl acetate (1000 ml), and the precipitated copolymer is collected by filtration and dried.

A series of invention copolymers are prepared in accordance with the procedures described above, as summarized in the Table.

The corresponding diester copolymers are obtained by reacting the main chain poly(maleic anhydride) polymer (10 g) with ethanol (50 ml) prior to the reaction with the chromophoric reactant. Crosslinked derivatives are obtained by utilizing polytetrahydrofuran (M.W. of 650) in place of ethanol.

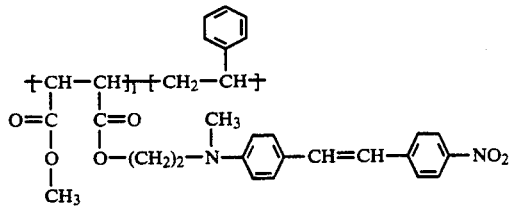

To a stirred solution of the Table copolymer 3 (10.25 g, 25 mmole) in cyclopentanone (120 ml) is added slowly 4-[N-(2-hydroxyethyl)-N-methylamino]-4'-nitrostilbene (8.94 g, 30 mmol). A 2 molar excess of p-dimethylaminopyridine (DMAP) (8.1 g, 60 mmol) is added, and the solution is stirred for 15 hours at 90° C.

A mixture of pyridine (30 ml), a 40% w/w solution of t-butylammonium hydroxide in water (19.5 g, 30 mmol) and methyl iodide (43 g, 30 mmol) is added to the solution, and the resultant reaction medium is stirred for 15 hours at 90° C.

The product solution is cooled to room temperature and poured into 1-propanol. The formed copolymer precipitate is collected by filtration, dissolved in dichloromethane, and reprecipitated in ethyl acetate. The collected precipitate is dissolved in dichloromethane, reprecipitated in diethyl ether, and then collected by filtration and dried.

EXAMPLE V

This Example illustrates the preparation of an invention side chain copolymer.

TABLE

| Side Chain Copolymer Number | Main Chain CoPolymer[1] | Chromophore[2] | Percent Incorporation | Solvent | Reaction Time (hours) | Temp. °C. | Catalyst[3] | $T_g$ |
|---|---|---|---|---|---|---|---|---|
| I | 1 | A | 20 | cyclopentanone | 15 | 100 | DMAP | 145 |
| II | 2 | A | 25 | cyclopentanone | 15 | 100 | DMAP | 115 |
| III | 3 | A | 35 | cyclopentanone | 15 | 100 | DMAP | 137 |
| IV | 3 | A | 40 | tetrahydrofuran | 15 | 60 | TFA | 142 |
| V | 3 | B | 40 | tetrahydrofuran | 15 | 60 | TFA | 140 |
| VI | 3 | C | 35 | tetrahydrofuran | 15 | 60 | TFA | 135 |
| VII | 4 | C | 17 | pyridine | 72 | 90 | DMAP | 129 |
| VIII | 5 | C | 20 | tetrahydrofuran | 24 | 60 | TFA | — |

[1]Main chain copolymers.
1. 1:1 styrene:maleic anhydride (M.W. 1600, $T_g$ 145)
2. 2:1 styrene:maleic anhydride (M.W. 1700, $T_g$ 136)
3. 3:1 styrene:maleic anhydride (M.W. 1900, $T_g$ 123)
4. 1:1 high M.W. styrene:maleic anhydride (Ex. II)
5. 1:1 high M.W. butyl vinyl ether: maleic anhydride (Ex. II)
[2]Chromophores.
A. 4-[N-(2-Hydroxyethyl)-N-methylamino]-4'-nitrostilbene
B. 4-[4'-N-(2-hydroxyethyl)-N-ethylamino-phenylazo]nitrobenzene
C. 4-[4'-N-(2-hydroxyethyl)N-ethylamino-phenylazo]nitrobenzene
[3]Catalysts.
p-Dimethylaminopyridine (DMAP)
Trifluoroacetic acid (TFA)

EXAMPLE IV

This Example illustrates the preparation of an invention side chain copolymer.

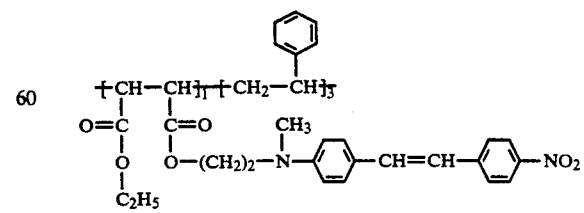

A solution of the Table copolymer 3 in ethanol is refluxed for about 15 hours until all of the copolymer has dissolved. The resultant product solution is poured into cyclohexanone to form a precipitate. The liquid medium is decanted, and the recovered acid ester precipitate is dried under vacuum.

The acid ester intermediate (3 g, 6.57 mmol) is dissolved in tetrahydrofuran (70 ml), and to the solution is added 2-chloro-1-methylpyridinium iodide (1.68 g, 6.57 mmol) and 4-[N-(2-hydroxyethyl)-N-methylamino]-4'-nitrostilbene (1.96 g, 6.57 mmol).

The resultant slurry is treated with trifluoroacetic acid (1.98 g, 6.57 mmol), and the reaction mixture is refluxed for 48 hours. The product medium then is poured into water, and the formed copolymer precipitate is collected and dried. The crude product is dissolved in tetrahydrofuran and precipitated in 1-propanol three times, and then precipitated once in methanol and dried under vacuum.

EXAMPLE VI

This Example illustrates the construction and operation of an optical frequency converting waveguide module in accordance with the present invention.

A silicon dioxide-coated silicon wafer with a grating electrode is constructed by means of the following fabrication procedures.

A commercially available silicon dioxide-coated silicon wafer is placed in a Varian beam electron beam vacuum deposition system. A 0.1 μm layer of 99.999% purity aluminum is deposited on the wafer.

AZ-1518 positive photoresist (Hoechst) is spin-coated on the aluminum-coated wafer with a Solitec model 5100 coater. A 1.5 μm photoresist coating is achieved by spinning at 5000 rpm for 30 seconds. The photoresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 μm radiation (70 mJ/cm²).

The mask is removed, and a thin piece of silicon (1 cm×2 cm) is placed on the surface of the patterned photoresist as a protective shield, and the combination is exposed to 70 mJ/cm² of 405 μm radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water.

The aluminum grating electrode surface of the wafer then is covered with a 1.5 μm cladding layer of 20% polyvinyl alcohol (75% hydrolyzed) in water by spin-coating at 5000 rpm for 30 seconds, and the cladding layer is dried in a vacuum oven at 110° C. for two hours.

A nonlinear optically active organic layer of 1.65 μm thickness is spin-coated on the cladding layer at 3000 rpm. The spin-coating medium is a 20% solution of the Example III copolymer V in trichloropropane. The organic layer is dried in a vacuum oven at 160° C. for one hour.

An upper cladding layer of 1.5 μm thickness is added by spin-coating a medium of polysiloxane (GR-651-L, Owens-Illinois Inc., 25% solids in 1-butanol) at 3500 rpm for 30 seconds. The cladding layer is dried in a vacuum oven at 110° C. for 35 minutes. A 0.055 μm coating of aluminum is deposited as an electrode layer on the upper cladding layer.

The fabricated waveguide is placed in a Mettler hot stage, and the unit is raised to 130° C. at 1° C./min. A DC field of 70 V/μm is applied across the waveguiding organic layer for ten minutes by means of the electrodes. The electric field is maintained while the waveguide sample is cooled to room temperature at 1° C./min. The $\chi^{(2)}$ nonlinear optical response of the waveguiding medium is $1\times 10^{-8}$ esu as measured at 1.34 μm excitation wavelength.

The waveguide structure is cleaved at opposite ends to provide two sharp faces to couple light in and out of the waveguiding organic layer.

Cylindrical lenses are employed to focus and couple 1.34 radiation (0.01 mJ, 10 nsec wide pulse) into the waveguide. The waveguide is situated on a rotation stage, and phase matched second harmonic generation is observed when the waveguide is rotated until the periodicity satisfies the value for phase matching. Under the described operating conditions, about 1% of the fundamental beam is converted into an observed second harmonic radiation.

What is claimed is:

1. A copolymer which is characterized by recurring monomeric units corresponding to the formula:

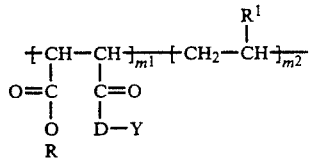

wherein $m^1$ and $m^2$ are integers which total at least 10, and the $m^1$ monomer comprises between about 10–90 mole percent of the total $m^1+m^2$ monomeric units; R is hydrogen or a $C_1$-$C_{10}$ hydrocarbyl substituent; $R^1$ is a $C_1$-$C_4$ alkoxyl or $C_6$-$C_{12}$ aromatic substituent; D is —O— or —NH—; and Y is a pendant organic side chain containing a conjugated structure and an electron-withdrawing group selected from the group consisting of —NO₂, —CN, —CF₃, —CH=C(CN)₂, —C(CN)=C(CN)₂, and —SO₂CF₃, such that the D—Y-electron-withdrawing moiety exhibits nonlinear optical susceptibility.

2. A copolymer in accordance with claim 1 which has a weight average molecular weight in the range between about 5000–200,000.

3. A copolymer in accordance with claim 1 which has a glass transition temperature $T_g$ in the range between about 40°–150° C.

4. A copolymer in accordance with claim 1 which exhibits liquid crystalline properties.

5. A crosslinked copolymer which is characterized by recurring monomeric units corresponding to the formula:

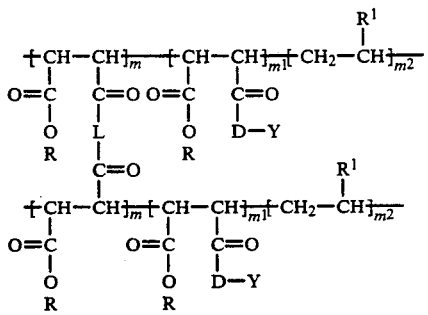

where $m^1$ and $m^2$ are integers which total at least 10, and the $m^1$ monomer comprises between about 10–90 mole percent of the total $m^1+m^2$ monomeric units; R is hydrogen or a $C_1$-$C_{10}$ hydrocarbyl substituent; $R^1$ is a $C_1$-$C_4$ alkoxyl or $C_6$-$C_{12}$ aromatic substituent; D is —O— or —NH—; and Y is a pendant organic side chain containing a conjugated structure and an electron-withdrawing group selected from the group consisting of —$NO_2$, —CN, —$CF_3$, —CH=C(CN)$_2$, —C(CN)=C(CN)$_2$, and —$SO_2CF_3$, such that the D—Y-electron-withdrawing moiety exhibits nonlinear optical susceptibility; and L is a crosslinking branch which has a chain length of between about 2–20 atoms.

6. A copolymer in accordance with claim 5 wherein m in the formula is one.

7. A copolymer in accordance with claim 5 wherein R in the formula is hydrogen or a $C_1$-$C_4$ alkyl group.

8. A copolymer in accordance with claim 5 wherein $R^1$ in the formula is methoxy.

9. A copolymer in accordance with claim 5 wherein $R^1$ in the formula is phenyl or 4-acyloxyphenyl.

10. A copolymer in accordance with claim 5, wherein Y in the formula contains a diphenyl, stilbene or azobenzene structure, wherein Y contains an electron-withdrawing group selected from the group consisting of —$NO_2$, —CN, —$SO_2CF_3$, —CH=C(CN)$_2$, —C(CN)=C(CN)$_2$, and $CF_3$, and wherein said D moiety and said electron-withdrawing group are positioned on said Y moiety such that electrons donated by said D moiety pass through said Y moiety to said electron-withdrawing group.

11. A copolymer in accordance with claim 5 which has a $T_g$ in the range between about 60°–200° C.

12. A copolymer which is characterized by recurring monomeric units corresponding to the formula:

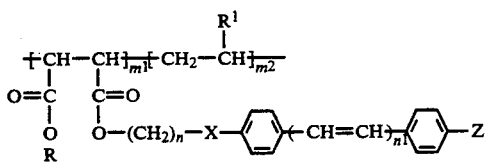

where $m^1$ and $m^2$ are integers which total at least 10, and the $m^1$ monomer comprises between about 10–90 mole percent of the total $m^1+m^2$ monomeric units; R is a hydrogen or a $C_1$-$C_{10}$ hydrocarbyl substituent; $R^1$ is a $C_1$-$C_4$ alkoxyl or $C_6$-$C_{12}$ aromatic substituent; n is an integer with a value of 2–10; $n^1$ is an integer with a value of 0–2; X is an electron-donating group selected from the group consisting of —O—, —S— and —$NR^2$—, with $R^2$ being hydrogen or a $C_1$-$C_4$ alkyl substituent,; and Z is an electron-withdrawing group selected from the group consisting of —$NO_2$, —CN, —$CF_3$, —CH=C(CN)$_2$, —C(CN)=C(CN)$_2$ and —$SO_2CF_3$.

13. A copolymer in accordance with claim 12 which has a $T_g$ in the range between about 40°–150° C.

14. A copolymer in accordance with claim 12 which exhibits liquid crystalline and nonlinear optical susceptibility properties.

15. A copolymer which is characterized by recurring monomeric units corresponding to the formula:

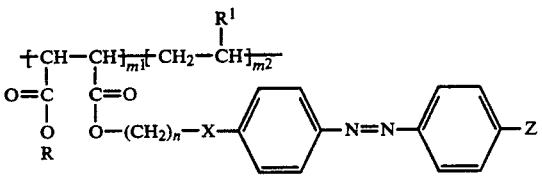

where $m^1$ and $m^2$ are integers which total at least 10, and the $m^1$ monomer comprises between about 10–90 mole percent of the total $m^1+m^2$ monomeric units; R is a hydrogen or a $C_1$-$C_{10}$ hydrocarbyl substituent; $R^1$ is a $C_1$-$C_4$ alkoxyl or $C_6$-$C_{12}$ aromatic substituent; n is an integer with a value of 2–10; X is an electron-donating group selected from the group consisting of —O—, —S— and —$NR^2$—, with $R^2$ being hydrogen or a $C_1$-$C_4$ alkyl substituent,; and Z is an electron-withdrawing group selected from the group consisting of —$NO_2$, —CN, —CH=C(CN)$_2$, —C(CN)=C(CN)$_2$, and —$SO_2CF_3$, and $CF_3$.

16. A copolymer in accordance with claim 15 which has a $T_g$ in the range between about 40°–150° C.

17. A copolymer in accordance with claim 15 which exhibits liquid crystalline and nonlinear optical susceptibility properties.

18. An optical medium comprising a thin film of a copolymer which is characterized by recurring monomeric units corresponding to the formula:

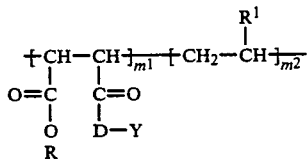

where $m^1$ and $m^2$ are integers which total at least 10, and the $m^1$ monomer comprises between about 10–90 mole percent of the total $m^1+m^2$ monomeric units; R is a hydrogen or a $C_1$-$C_{10}$ hydrocarbyl substituent; $R^1$ is a $C_1$-$C_4$ alkoxyl or $C_6$-$C_{12}$ aromatic substituent; D is —O—, —NH—; and Y is a pendant organic side chain containing a conjugated structure and an electron-withdrawing group selected from the group consisting of —$NO_2$, —CN, —$CF_3$, —CH=C(CN)$_2$, —C(CN)=C(CN)$_2$, and —$SO_2CF_3$, such that the D—Y-electron-withdrawing moiety exhibits nonlinear optical susceptibility.

19. An optical medium in accordance with claim 18 which has an external field-induced noncentrosymmetric molecular orientation, and exhibits second order nonlinear optical susceptibility $\chi^{(2)}$.

20. An optical medium comprising a thin film of a crosslinked copolymer which is characterized by recurring monomeric units corresponding to the formula:

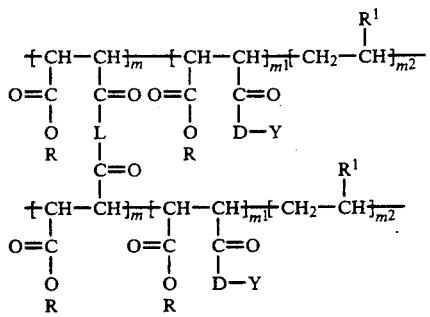

where $m^1$ and $m^2$ are integers which total at least 10, and the $m^1$ monomer comprises between about 10–90 mole percent of the total $m^1+m^2$ monomeric units; R is a hydrogen or a $C_1$–$C_{10}$ hydrocarbyl substituent; $R^1$ is a $C_1$–$C_4$ alkoxyl or $C_6$–$C_{12}$ aromatic substituent; D is —O— or —NH—; and Y is a pendant organic side chain containing a conjugated structure and an electron-withdrawing group selected from the group consisting of —$NO_2$, —CN, —$CF_3$, —CH=C(CN)$_2$, —C(CN)=C(CN)$_2$, and —$SO_2CF_3$, such that the D—Y-electron-withdrawing moiety exhibits nonlinear optical susceptibility; and L is a crosslinking branch which has a chain length of between about 2–20 atoms.

21. An optical medium in accordance with claim 20 which has an external field-induced noncentrosymmetric molecular orientation, and exhibits second order nonlinear optical susceptibility $\chi^{(2)}$.

22. An optical medium comprising a thin film of a copolymer which is characterized by recurring monomeric units corresponding to the formula:

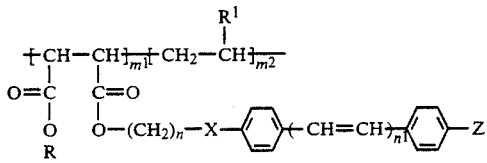

where $m^1$ and $m^2$ are integers which total at least 10, and the $m^1$ monomer comprises between about 10–90 mole percent of the total $m^1+m^2$ monomeric units; R is a hydrogen or a $C_1$–$C_{10}$ hydrocarbyl substituent; $R^1$ is a $C_1$–$C_4$ alkoxyl or $C_6$–$C_{12}$ aromatic substituent; n is an integer with a value of 2–10; $n^1$ is an integer with a value of 0–2; X is an electron-donating group selected from the group consisting of —O—, —S— and —$NR^2$—, with $R^2$ being hydrogen or a $C_1$–$C_4$ alkyl substituent,; and Z is an electron-withdrawing group selected from the group consisting of —$NO_2$, —CN, —$CF_3$, —CH=C(CN)$_2$, —C(CN)=C(CN)$_2$ and —$SO_2CF_3$.

23. An optical medium in accordance with claim 22 which has an external field-induced noncentrosymmetric molecular orientation, and exhibits second order nonlinear optical susceptibility $\chi^{(2)}$.

24. An optical medium comprising a thin film of a copolymer which is characterized by recurring monomeric units corresponding to the formula:

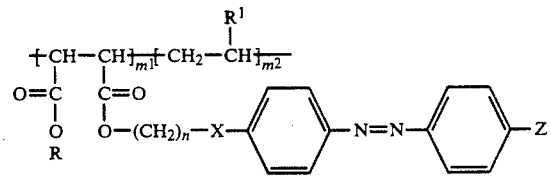

where $m^1$ and $m^2$ are integers which total at least 10, and the $m^1$ monomer comprises between about 10–90 mole percent of the total $m^1+m^2$ monomeric units; R is a hydrogen or a $C_1$–$C_{10}$ hydrocarbyl substituent; $R^1$ is a $C_1$–$C_4$ alkoxyl or $C_6$–$C_{12}$ aromatic substituent; n is an integer with a value of 2–10; X is an electron-donating group selected from the group consisting of —O—, —S— and —$NR^2$—, with $R^2$ being hydrogen or a $C_1$–$C_4$ alkyl substituent,; and Z is an electron-withdrawing group selected from the group consisting of —$NO_2$, —CN, and $CF_3$.

25. An optical medium in accordance with claim 24 which has an external field-induced noncentrosymmetric molecular orientation, and exhibits second order nonlinear optical susceptibility $\chi^{(2)}$.

* * * * *